United States Patent Office 3,325,180
Patented June 13, 1967

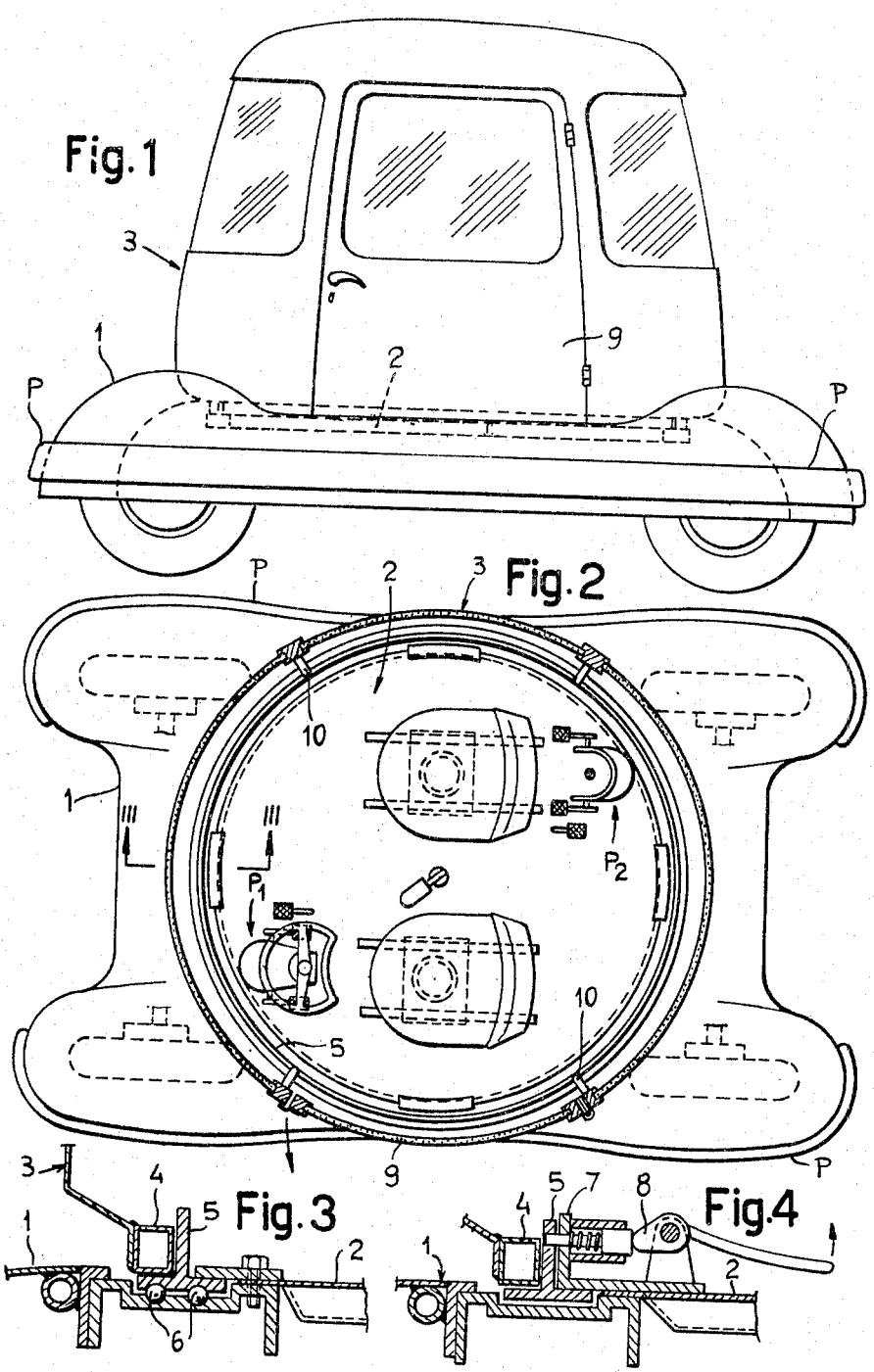

3,325,180
ROTATABLE VEHICLE BODY TO FACILITATE ENTRY AND EXIT
Pier Girolamo Bargagli Bardi Bandini, Villa Poggio Adorno, Castelfranco di Sotto, Pisa, Italy, and Narciso Cristiani, Staffoli, Pisa, Italy
Filed Apr. 20, 1965, Ser. No. 449,400
Claims priority, application Italy, Apr. 22, 1964, 9,368/64; May 15, 1964, 10,960/64
9 Claims. (Cl. 280—29)

This invention relates to vehicles and more particularly to road vehicles.

It is an object of the present invention to provide a vehicle which is particularly suitable for use in crowded city conditions where easy entry to and exit from a vehicle are desirable despite the presence of obstructions adjacent the vehicle.

An embodiment of a vehicle in accordance with the invention will now be described, by way of example, with reference to the accompanying diagrammatic drawing, in which:

FIG. 1 is a side view of the vehicle;
FIG. 2 is a plan view of the vehicle with the body thereof in section;
FIG. 3 is a section view on the line III—III of FIG. 2; and
FIG. 4 is a section similar to that of FIG. 3 but showing a device for locking the body with respect to the vehicle frame.

Referring to the drawing, a chassis structure 1 is connected to the road wheels through a suitable suspension system, or connected to the wheels without any suspension system, and in its turn provided with a suspended floor 2 which forms a part of a body structure. The floor 2 has the form of a circular plate. The structure 1, 2 can serve with more than one form of body structure.

A body structure 3 has a circular periphery joined to the periphery of the floor 2, and an annular box-section frame 4 at its lower edge which is secured to the structure 1, 2.

A movable ring 5 of inverted T-section surrounds and is slidably mounted for rotation about the center of the floor 2, and for this purpose balls 6 (FIG. 3) or other bearings are provided.

The ring 5 can be locked to the assembly 1, 2 by a locking means including a latch 7 (FIG. 4) which is mounted at the outer edge of the floor 2 and is operated by a cam 8, and which can be inserted into one of several holes disposed around the ring 5. The locking means may be operated also directly by the opening handle of a door 9 provided in the body 3.

The box-section frame 4 of the body 3 can be mounted on the ring 5 and can be secured thereon either permanently or in an easily removable manner if alternative bodies are to be provided.

The body 3 has either a single door 9 or a pair of doors 9 opposite each other. The structure can be modified to provide front and rear recesses between the mud guards and having such a width that it is possible to climb in and climb out of the body, either at the two sides or at the front or the rear. The assembly 3, 4, 5 can be rotated to locate the door 9 or each of the doors at such a position that it is convenient for alighting in relation to obstructions surrounding the vehicle. The rotation can be effected from the interior of the body.

Two steering stations diametrically opposite one another, $P_1$ and $P_2$, may be provided. A reversing gear may also be provided and in this case, the cabin may be locked at two diametrically opposite positions, to obtain in each case a wide visibility from the windows which must be at the front with respect to the vehicle driving direction.

In order to effect rotation of the body structure 3, internal handles 10 are provided.

The vehicle is advantageously provided with bumpers P on the sides and on the front and rear projecting portions.

The steering wheel, dashboard and other controls may be carried by an upstanding structure which passes through the floor. This structure may have adjustment means for varying its inclination to the vertical depending on the form of body fitted.

We claim:
1. In a vehicle,
a body defining a compartment for operator and passengers, said body having an opening therein for entry to the interior of the body and for exit therefrom,
a floor structure,
a wheel-carrying structure supporting the vehicle, said floor structure being fixed relatively to the wheel-carrying structure, and
means mounting the body on the floor structure permitting rotation of the body with respect to the floor structure whereby entry into and exit from the body can be made through said opening in the body in any one of a multiplicity of positions relative to the wheel-carrying structure.
2. In a vehicle according to claim 1 means for selectively locking the body and the floor structure in at least four angular positions distributed around said floor structure.
3. In a vehicle according to claim 1, wherein said means mounting the body on the floor structure comprises means enabling detachment and replacement of the body on the floor structure.
4. In a vehicle according to claim 1, wherein said body and floor structure are of generally circular outline.
5. In a vehicle according to claim 1,
means for locikng the body with respect to the floor structure at any one of a plurality of positions.
6. In a vehicle according to claim 1,
a chassis forming part of the wheel-carrying structure.
7. In a vehicle,
a body having an access opening therein and a lower circular edge,
a floor structure,
wheel-carrying structure supporting the vehicle and fixed with respect to the floor structure,
a ring member carried by the lower edge of the body, said member having an annular groove of part-circular section,
an inverted annular channel-section member secured to the periphery of the floor structure, said channel-section member having an annular groove of part-circular section corresponding to the groove of the ring member, and a plurality of balls arranged to run in the said grooves and to support the body on the floor structure.

8. In a vehicle according to claim 7, an annular box-section member secured to the lower edge of the body.

9. A vehicle according to claim 7, wherein the ring member is of inverted T-section.

References Cited

UNITED STATES PATENTS

| | | | |
|---|---|---|---|
| 475,157 | 5/1892 | Shanafelt | 52—65 X |
| 1,419,960 | 6/1922 | Dell. | |
| 1,640,873 | 8/1927 | Balzer et al. | |
| 1,995,501 | 3/1935 | Dillon | 180—89 X |
| 2,051,753 | 8/1936 | Steckly | 296—24 |
| 2,563,845 | 8/1951 | Johnson | 296—146 X |
| 2,791,438 | 5/1957 | Ruf | 180—77 |
| 2,822,055 | 2/1958 | Ludowici. | |
| 2,846,962 | 8/1958 | Morgan | 52—65 |
| 2,967,073 | 1/1961 | Gagliardi | 296—146 |
| 2,997,332 | 8/1961 | Schlumbohm | 296—28 |

LEO FRIAGLIA, *Primary Examiner.*